Patented Mar. 27, 1951

2,546,653

UNITED STATES PATENT OFFICE 2,546,653

CHLORINATED DERIVATIVES OF 1-PYRIDINDENE AND THEIR PREPARATION

John Thomas Plati, Passaic, and Wilhelm Wenner, Montclair, N. J., assignors to Hoffmann-La Roche Inc., Nutley, N. J., a corporation of New Jersey No Drawing. Application March 4, 1950,
Serial No. 147,755

11 Claims. (Cl. 260—290)

This invention relates to new chlorinated derivatives of 1-pyridindene, and to processes of making the same; and more particularly relates to 2 - methyl-7-chloro-9-p-chlorophenyl-2,3-dihydro-1-pyridindene, 2 - methyl - 7-chloro-9-p-chlorophenyl-2,3,4,9-tetrahydro-1 - pyridindene, and their salts. The parent ring system, 1-pyridindene, and various compounds derived from that system have previously been disclosed in our Patent No. 2,470,109, granted May 17, 1949. The system of nomenclature employed in that patent to identify the derivatives of 1-pyridindene is followed in the present disclosure also.

The new derivatives are useful in the preparation of medicinals. In particular, acid addition salts of 2 - methyl - 7-chloro-9-p-chlorophenyl-2,3,4,9-tetrahydro-1-pyridindene have spasmolytic properties.

Briefly, the new compounds may be prepared in the following manner: Parachloro-acetophenone is reacted with methylamine hydrochloride and formaldehyde to produce N,N-bis-(β-p-chlorobenzoylethyl)-methylamine hydrochloride. The latter is cyclized by treatment with sodium hydroxide to produce 1-methyl-3-p-chlorobenzoyl-4-hydroxy-4-p - chlorophenyl - piperidine. This piperidine derivative is treated with concentrated aqueous hydrobromic acid (for example, having a concentration of about 40-48 per cent), resulting in further cyclization to produce 2-methyl-7-chloro - 9 - p - chlorophenyl-2,3-dihydro-1-pyridindene hydrobromide. Alternatively, the same compound may be produced directly from N,N-bis-(β-p - chlorobenzoylethyl) - methylamine by treatment with strong aqueous hydrobromic acid. By hydrogenation of the 2-methyl-7-chloro-9-p-chlorophenyl-2,3-dihydro-1-pyridindene or an acid salt thereof, the corresponding tetrahydro derivative, that is, 2-methyl-7-chloro-9-p-chlorophenyl-2,3,4,9-tetrahydro - 1 - pyridindene or an acid salt thereof, is obtained. The tetrahydro derivative can be isolated directly as the hydrobromide, but is more conveniently isolated after conversion to the corresponding thiocyanate. The free base may be obtained by careful addition of alkali to the thiocyanate. Other acid addition salts may be prepared, such as the hydrochloride, the tartrate, and the maleate; for example, by reacting the free base with the appropriate acid. Similarly, quaternary salts may be prepared, such as the methobromide, the methiodide, and the methosulfate; for example, by treating the free base with the appropriate quaternizing agent.

The following examples illustrate the invention, but should not be deemed to limit the invention, since equivalents to the embodiments specifically described will be obvious to those skilled in the art.

EXAMPLE 1

*N,N-bis-(β-p-chlorobenzoylethyl) - methylamine hydrochloride*

A mixture of 78 g. of p-chloroacetophenone, 16 g. of paraformaldehyde, and 17 g. of methylamine hydrochloride was heated with stirring to a temperature of about 100°–110° C. A vigorous reaction ensued; heating and stirring were discontinued, and the reaction mixture was cooled. When it had reached a temperature of about 50°–60° C., 200 cc. of acetone were added and stirring was resumed. The crystalline solid which formed was filtered off and recrystallized from ethanol. It was identified as N,N-bis-(β-p-chlorobenzoylethyl)-methylamine hydrochloride, M. P. approximately 160°–162° C.

EXAMPLE 2

*1-methyl - 3 - p - chlorobenzoyl-4-hydroxy-4-p-chlorophenyl-piperidine*

To 100 cc. of boiling water were added 10 g. of N,N-bis-(β-p-chlorobenzoylethyl) - methylamine hydrochloride, and then 30 cc. of 10 per cent sodium hydroxide. The mixture was stirred and allowed to cool. The crystalline solid which separated was filtered off, recrystallized from benzene, and identified as 1-methyl-3-p-chlorobenzoyl-4-hydroxy-4-p-chlorophenyl - piperidine, M. P. approximately 156°–159° C. By reaction of the base with hydrochloric acid, the corresponding hydrochloride was obtained, M. P. approximately 192°–193° C.

EXAMPLE 3

*2-methyl-7-chloro-9-p - chlorophenyl - 2,3 - dihydro-1-pyridindene*

A mixture of 24.4 g. of 1-methyl-3-p-chlorobenzoyl-4-hydroxy-4-p-chlorophenyl - piperidine and 120 cc. of 48 per cent hydrobromic acid was refluxed, while stirring, for a period of about 7½ hours. The reaction mixture was allowed to stand for 15 hours and the crystalline precipitate which formed was filtered off, washed with 10 per cent hydrobromic acid, then with water, and finally recrystallized from 90 per cent ethanol. It was identified as 2-methyl-7-chloro-9-p-chlorophenyl-2,3-dihydro-1-pyridindene hydrobromide, M. P. approximately 209°–210° C. with decomposition. By careful neutralization with 10 per cent sodium hydroxide of an aqueous suspension of this hydrobromide, the free base, 2-methyl-7-chloro-9-p-chlorophenyl-2,3-dihydro-1-pyridindene, was obtained as a viscous oil.

EXAMPLE 4

*2-methyl-7-chloro-9-p-chlorophenyl-2,3-dihydro-1-pyridindene*

A mixture of 724 g. of N,N-bis-(β-p-chlorobenzoylethyl)-methylamine hydrochloride and 2900 cc. of 48 per cent hydrobromic acid was refluxed, while stirring, for 11 hours. The reaction mixture was cooled and allowed to stand at a temperature of about 20°–30° C. for 15 hours. The crystalline solid formed was then filtered off, washed with 20 per cent hydrobromic acid, then with water, and finally crystallized from 7 l. of ethanol. The product was identified as 2-methyl-7-chloro-9-p-chlorophenyl-2,3-dihydro-1-pyridindene hydrobromide, M. P. approximately 208°–210° C.

EXAMPLE 5

*2-methyl-7-chloro-9-p-chlorophenyl-2,3,4,9-tetrahydro-1-pyridindene*

A mixture of 30 g. of 2-methyl-7-chloro-9-p-chlorophenyl-2,3-dihydro-1-pyridindene hydrobromide, 160 cc. of ethanol, and 50 g. of Raney nickel catalyst was hydrogenated at 30° C. under a hydrogen pressure of about 3.5 atmospheres for about 2½ hours.

The reaction mixtures resulting from five identical batches, prepared in the manner above described, were combined. The catalyst was filtered off, and the filtrate was distilled at about 50° C. in vacuo (about 20 mm. Hg.) to remove the solvent. The residue was dissolved in 3400 cc. of warm water (approximately 50°–60° C.). The solution was cooled to 37° C. and mixed with a solution of 170 g. of potassium thiocyanate in 340 cc. of water. The mixture was allowed to stand for two hours, and the supernatant liquid was decanted from a heavy viscous precipitate which had settled on the bottom of the container. The precipitate was washed by decantation with 550 cc. of water and was then crystallized from 315 cc. of ethanol, yielding a product identified as 2-methyl-7-chloro-9-p-chlorophenyl-2,3,4,9-tetrahydro-1-pyridindene thiocyanate, M. P. approximately 204°–207° C.

To a suspension of 90 g. of this thiocyanate in 500 cc. of ethanol were added slowly, with shaking, 400 cc. of 10 per cent sodium hydroxide. During the addition of the alkali, the thiocyanate gradually went into solution. After complete addition of the alkali, an oil precipitated. 400 cc. of water were added to the mixture, which was then allowed to stand at about 20°–30° C. for 15 hours. At the end of this time, the oil had solidified. The solid cake was broken up, filtered off, and dissolved in 400 cc. of ethanol at about 50° C. Approximately 120 cc. of water were added to the solution, resulting in a slight turbidity; and the mixture was again allowed to stand for a period of 15 hours at about 3°–8° C. The crystals which formed were filtered off, washed with 50 per cent alcohol, and dried in a vacuum desiccator over potassium hydroxide at about 3°–8° C. The product was identified as the free base, 2-methyl-7-chloro-9-p-chlorophenyl-2,3,4,9-tetrahydro-1-pyridindene, M. P. approximately 90°–92° C.

To a solution of 5 g. of this tetrahydro base in about 100 cc. of ether was added an ethereal solution of 3 g. of maleic acid. The crystalline product which precipitated was filtered off, washed with ether, dried, and identified as 2-methyl-7-chloro-9-p-chlorophenyl-2,3,4,9-tetrahydro-1-pyridindene maleate, M. P. approximately 170°–172° C.

To a solution of 5 g. of the above tetrahydro base in 100 cc. of benzene was added a solution of 5 g. of tartaric acid in 20 cc. of ethyl alcohol. The crystalline product which precipitated was filtered off, washed with benzene, dried, and identified as 2-methyl-7-chloro-9-p-chlorophenyl-2,3,4,9-tetrahydro-1-pyridindene tartrate, M. P. approximately 130° C. with previous softening.

EXAMPLE 6

*2-methyl-7-chloro-9-p-chlorophenyl-2,3,4,9-tetrahydro-1-pyridindene hydrobromide*

A mixture of 20 g. of 2-methyl-7-chloro-9-p-chlorophenyl-2,3-dihydro-1-pyridindene hydrobromide, 100 cc. of ethanol and 30 g. of Raney nickel catalyst was hydrogenated at 35° C. under a hydrogen pressure of about 3.5 atmospheres for about 3 hours. The catalyst was filtered off, and the filtrate was distilled at about 50° C. in vacuo (approximately 20 mm. Hg.) to remove the solvent. After standing for about five days, the residue had not crystallized. It was then dissolved in 60 cc. of acetone, and the solution was allowed to stand for 20 hours at approximately 20°–25° C. The crystals which formed were filtered off, washed with acetone, and recrystallized from alcohol. The product thus obtained was identified as 2-methyl-7-chloro-9-p-chlorophenyl-2,3,4,9-tetrahydro-1-pyridindene hydrobromide, M. P. approximately 218°–222° C.

EXAMPLE 7

*2-methyl-7-chloro-9-p-chlorophenyl-2,3,4,9-tetra-1-pyridindene methiodide*

2 g. of 2-methyl-7-chloro-9-p-chlorophenyl-2,3,4,9-tetrahydro-1-pyridindene were added to 10 cc. of methyl iodide. On shaking, the base dissolved. After a few minutes a crystalline precipitate separated. This was filtered off, washed with ether, dried, and identified as 2-methyl-7-chloro-9-p-chlorophenyl-2,3,4,9-tetrahydro-1-pyridindene methiodide, M. P. approximately 247°–248° C.

We claim:

1. A compound selected from the group consisting of 2-methyl-7-chloro-9-p-chlorophenyl-2,3-dihydro-1-pyridindene, 2-methyl-7-chloro-9-p-chlorophenyl-2,3,4,9-tetrahydro-1-pyridindene, and their salts.

2. 2-methyl-7-chloro-9-p-chlorophenyl-2,3-dihydro-1-pyridindene.

3. A salt of the compound of claim 2.

4. 2-methyl-7-chloro-9-p-chlorophenyl-2,3,4,9-tetrahydro-1-pyridindene.

5. A salt of the compound of claim 4.

6. A hydrohalide of the compound of claim 4.

7. A maleate of the compound of claim 4.

8. A process of producing a compound selected from the group consisting of 2-methyl-7-chloro-9-p-chlorophenyl-2,3,4,9-tetrahydro-1-pyridindene and its salts which comprises hydrogenating a compound selected from the group consisting of 2-methyl-7-chloro-9-p-chlorophenyl-2,3-dihydro-1-pyridindene and its salts.

9. A process of producing a salt of 2-methyl-7-chloro-9-p-chlorophenyl-2,3,4,9-tetrahydro-1-pyridindene which comprises catalytically hydrogenating 2-methyl-7-chloro-9-p-chlorophenyl-2,3-dihydro-1-pyridindene in aqueous acid medium.

10. A process of producing 2-methyl-7-chloro- 9-p-chlorophenyl-2,3-dihydro-1-pyridindene hydrobromide which comprises cyclizing N,N-bis-(β-p-chlorobenzoylethyl)-methylamine by means of concentrated aqueous hydrobromic acid.

11. A process of producing 2-methyl-7-chloro-9-p-chlorophenyl-2,3,-dihydro-1-pyridindene hydrobromide which comprises cyclizing 1-methyl-3-p-chlorobenzoyl-4-hydroxy-4-p-chlorophenyl-piperidine by means of concentrated aqueous hydrobromic acid.

JOHN THOMAS PLATI.
WILHELM WENNER.

No references cited.